United States Patent [19]

Uchida et al.

[11] Patent Number: 4,896,190

[45] Date of Patent: Jan. 23, 1990

[54] IMAGE FORMING APPARATUS WITH BATTERY

[75] Inventors: Haruo Uchida; Kazumi Umezawa, both of Yokohama; Shinichi Sasaki, Fujisawa, all of Japan

[73] Assignee: Canon Kabushiki Kaisha, Tokyo, Japan

[21] Appl. No.: 156,810

[22] Filed: Feb. 17, 1988

[30] Foreign Application Priority Data

Feb. 27, 1987 [JP] Japan ................................ 62-044927
Mar. 2, 1987 [JP] Japan ................................ 62-030144

[51] Int. Cl.⁴ ...................... G03G 21/00; G03B 27/52; H01H 3/16; H01H 9/06

[52] U.S. Cl. .............................. 355/202; 200/61.58 R; 200/61.85; 355/21

[58] Field of Search .................... 355/21, 51, 3 R, 133, 355/202; 354/288; 200/61.58 R, 61.79, 61.8, 61.85, 61.62; 320/2, 13

[56] References Cited

U.S. PATENT DOCUMENTS

| | | | |
|---|---|---|---|
| 1,116,276 | 11/1914 | Hoffman et al. | 200/61.85 |
| 2,758,197 | 8/1956 | Evans et al. | 200/61.79 |
| 4,274,126 | 6/1981 | Haberthur-Heilig | 200/61.85 X |
| 4,387,984 | 6/1983 | Sato | 355/21 X |
| 4,421,406 | 12/1983 | Feinleib | 355/51 X |
| 4,456,362 | 6/1984 | Masaki et al. | 355/21 X |
| 4,684,235 | 8/1987 | Kohomoto et al. | 355/21 X |
| 4,742,429 | 5/1988 | Arrendiell et al. | 200/61.62 |

*Primary Examiner*—Arthur T. Grimley
*Assistant Examiner*—Ed Pipala
*Attorney, Agent, or Firm*—Fitzpatrick, Cella, Harper & Scinto

[57] ABSTRACT

A portable image forming apparatus includes a photosensitive member, image forming device for forming an image on a recording medium using the photosensitive member, a battery for supplying power to drive the image forming device, a guiding member for guiding the recording member, the guiding member being swingably mounted to a frame of the apparatus adjacent an end thereof and being movable between a guiding position wherein the opposite end of the guiding member is away from the frame and an accommodating position wherein the opposite end is close to the frame, and a battery accommodating portion for accommodating the battery, the accommodating portion being provided with an openable cover, wherein the guiding member is overlaid to the cover when it takes the accommodating position.

14 Claims, 10 Drawing Sheets

IMAGE FORMING APPARATUS WITH BATTERY

FIELD OF THE INVENTION AND RELATED ART

The present invention relates to an image forming apparatus equipped as a power source with a battery such as a dry battery and a storage cell. As the image forming apparatus, there are an electrophotographic copying machine or printer.

Conventional image forming apparatuses such as electrophotographic copying machines are usually installed at a predetermined placed and use as a driving power source a commercial electric power. They are usually of big or middle size and are relatively heavy such that it is not easily carried around or it is not usable in a place where the commercial power source is not available, for example, outside an office or in cars.

Recently, advancement in image formation or recording technique, a digital control technique for the driving systems and parts and elements has made it possible to provide a compact image forming apparatus of a personal use (home use) type/portable type which is small in size and light in weight, and therefore, is possible to carry around, without degrading the image forming performance. It is possible to use as a driving source a battery, dry battery, storage cell or chargeable battery. In this case, the copying operation is possible outside or in cars where the commercial power is not available.

A battery-driven image forming apparatus has been found to involve some problems. For one thing, if the main switch is kept ON during the carrying action, it is possible that the apparatus suddenly operates. Further, if the main switch is kept ON for a long period of time, the battery is consumed without the image forming operation, and the apparatus becomes no longer operable when the apparatus is to be operated. Additionally, if the main switch is kept ON, a particular element or particular elements can be overheated, resulting in failure of the apparatus.

On the other hand, the image forming apparatus of a battery-driven and portable type, is quite frequently subjected to a swinging action, a vibratory action, impact or another external shock when it is carried around.

Therefore, there is a possibility that the battery unloadably accommodated in a battery accommodating box is possibly popped out by the battery itself pushing a cover of the accommodating box upon the external shock.

Usually, the battery is heavy, and therefore, if it pops out and falls, it will be easily damaged.

SUMMARY OF THE INVENTION

Accordingly, it is a principal object of the present invention to provide an image forming apparatus equipped with a battery wherein the problems peculiar to the provision of the battery are solved.

It is another object of the present invention to provide an image forming apparatus equipped with a battery wherein it is difficult for an operator to forget turning off a main switch during the carrying action or at the time of the termination of the image forming operation.

It is a further object of the present invention to provide an image forming apparatus equipped with a battery wherein the battery is positively prevented from popping out of the apparatus even when it is subjected to an external shock.

According to an embodiment of the present invention, the image forming apparatus is provided with a battery accommodating portion having an openable cover to prevent the battery from popping out. The cover is used as a guide means for a transfer material. Further, the main switch of the apparatus is turned off depending on the position of the cover. Or, the main switch is turned off when the apparatus is in the condition for carrying.

Because of one or more of those features, the present invention improves the operativity of an image forming apparatus equipped with a battery.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
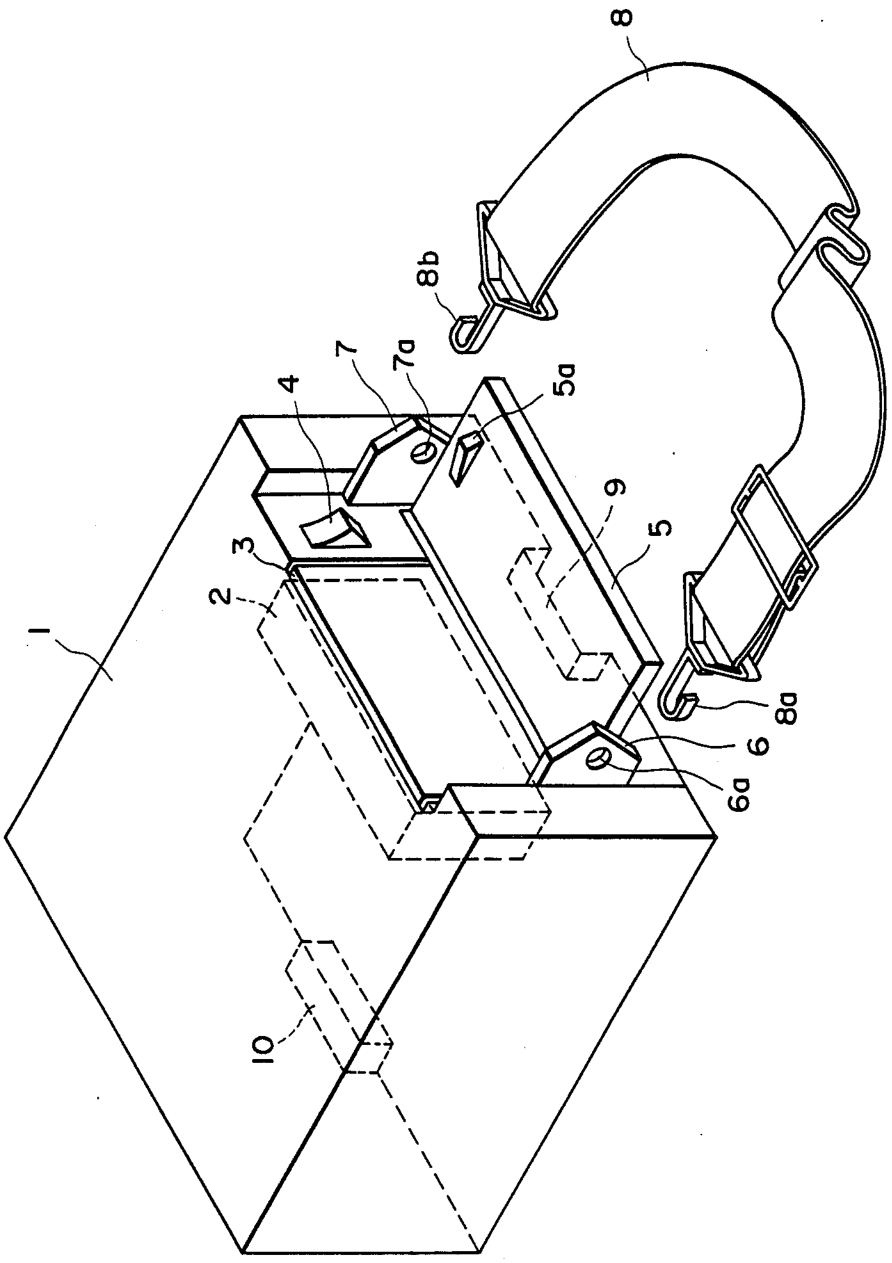
FIG. 1 is a perspective view of an image forming apparatus according to an embodiment of the present invention.

Referring to FIG. 1, there is shown an image forming apparatus according to an embodiment of the present invention. The image forming apparatus includes a main assembly 1, a battery functioning as a driving source for driving various process means, an openable battery cover 3, a main switch 4, an openable sheet feeding tray 5 for supporting a transfer material or transfer materials to be fed into the main assembly 1, a projection 5a for turning off the main switch 4 when the sheet feeding tray 5 is closed, grip supporting plates 6 and 7 fixed on the main assembly 1, holes 6a and 7a formed in the supporting plates for receiving strap hooks, a strap 8 having a variable length, hooks 8a and 8b for engaging the strap into the holes 6a and 7a, wherein the hooks 8a and 8*b* are engaged into the holes 6*a* and 7*a*, respectively.

When the strap 8 is hooked into the holes 6*a* and 7*a*, the apparatus can be hung on a shoulder by the strap 8, or it may be carried by hands by shortening the strap. In any case, the apparatus can be carried about in an upstanding position.

The main assembly 1 of the apparatus is provided with recesses 9 and 10 with which the apparatus can be carried about by both hands of the operator.

The description will be made with respect to a tray switch mechanism. In the first case, the apparatus 1 is carried around in an upstanding position using the strap 8.

Figure 2:
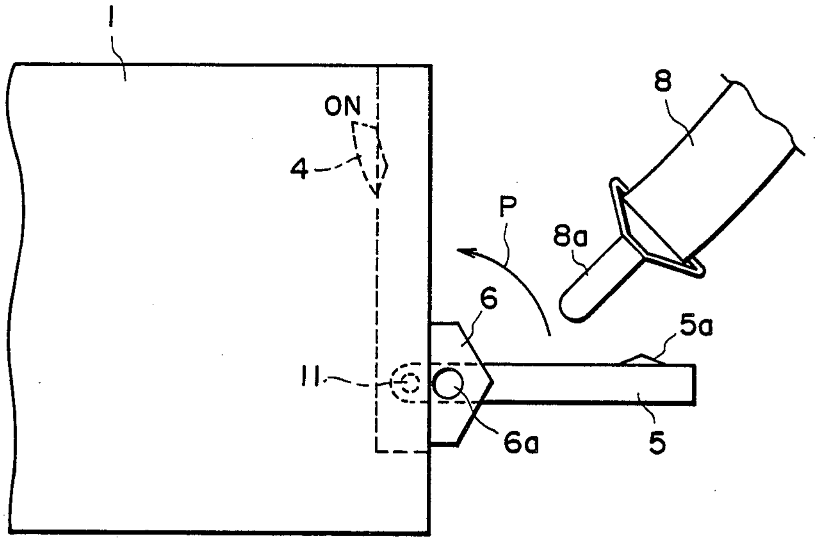
FIGS. 2 and 3 are front views of the image forming apparatus illustrating a switching operation.
Figure 3:
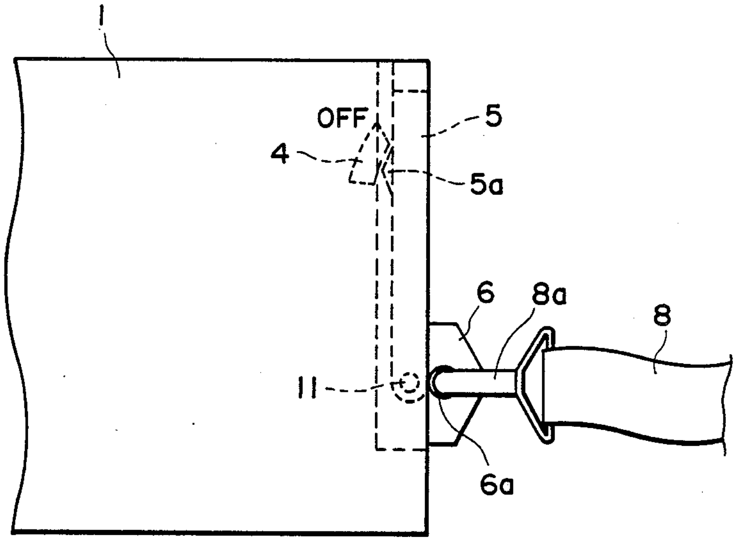

As shown in FIG. 2, when the sheet feeding tray 5 takes an open position (the main assembly is in the operative position), the strap hooking hole 6*a* is superposed with the sheet feeding tray 5, and therefore, the hook 8*a* can not be mounted into the hole 6*a* due to the existence of the feeding tray 5. When the sheet feeding tray 5 is rotated about a rotational shaft 11 in the counterclockwise direction indicated by an arrow p to its closing position, the main switch 4 which has been kept ON is depressed by a projection 5*a* of the feeding tray 5, by which the main switch 4 is turned off, as shown in FIG. 3.

The position of the hole 6*a* for the mounting of the strap is so determined that the hook 8*a* is not allowed to be mounted into the hole 6*a* until the feeding tray 5 is closed sufficiently for the projection 5*a* of the feeding tray 5 to turn off the main switch. Accordingly, whenever the strap is mounted, the main switch 4 is OFF. Also, the main switch 4 is so constructed that even when the feeding tray is opened, the power supply is not allowed until the main switch 4 is manually actuated. In this manner, when the apparatus is carried about in an upstanding position using the strap, the main switch is positively turned off with certainty.

Next, the description will be made as to when the apparatus is carried around using the gripping portions 9 and 10 by both hands of the operator.

Figure 4:
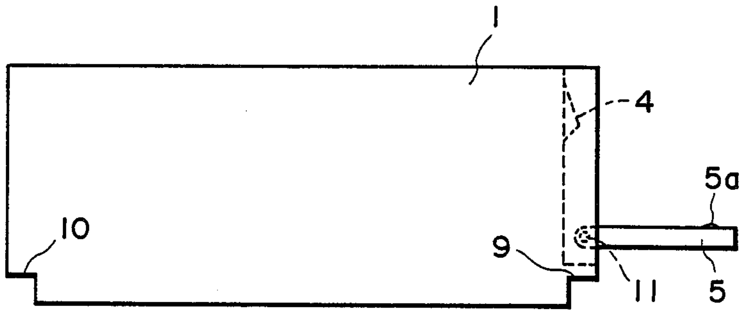
FIGS. 4 and 5 are front views of the image forming apparatus illustrating a switching operation depending on the carrying operation.
Figure 5:
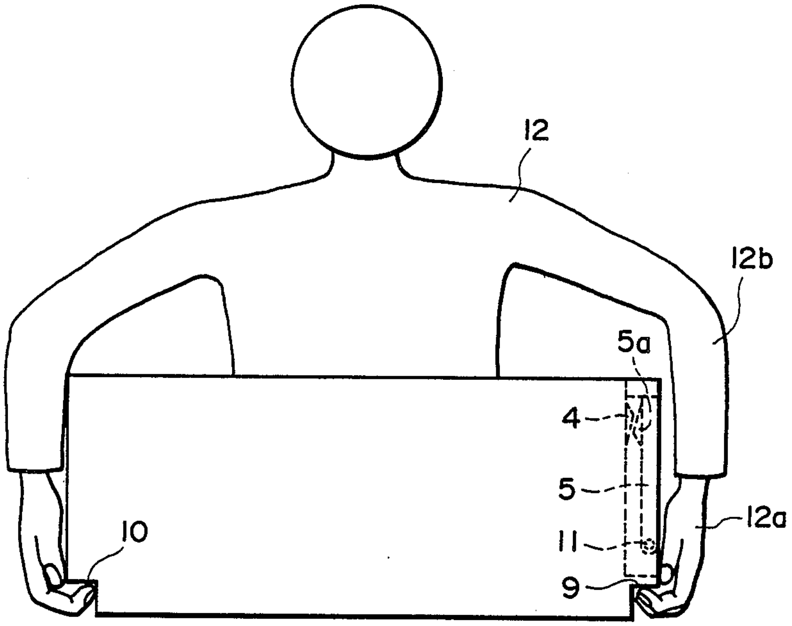

Referring to FIG. 4, the apparatus 1 is inoperative condition, the seesaw type main switch 4 is closed, whereas the sheet feeding tray 5 is in its open position. If, in this state, the operator attempts to lift the apparatus using the gripping portions 9 and 10, it is not possible or very difficult to do so as will be understood from FIG. 5. In other words, for the operator 12 to use the gripping portion 9 at the feeding tray side, the operator 12 has to first close the sheet feeding tray 5. Also, when the operator 12 carries the apparatus, his hand 12*a* and his arm 12*b* presses the sheet feeding tray 5 further toward its closing position. As described hereinbefore, the projection 5*a* of the feeding tray 5 in this state maintains the main switch OFF. In this manner, when the apparatus is carried using the gripping portions 9 and 10, the main switch can always be turned and maintained OFF.

According to this embodiment, it is prevented for the operator to forget turning off the main switch upon and during the apparatus carrying action, in which the image forming operation is not performed in the image forming apparatus equipped with a battery as a power source. Therefore, a dangerous start of operation, wasteful consumption of the battery and over-heating during carrying operation due to failure of turning off the main switch, can be positively prevented.

In the foregoing embodiment, the tray switch mechanism is provided in the sheet feeding tray, but the similar mechanism may be employed in an openable sheet discharging tray.

Further, a tray or cover mounted to the main assembly 1 other than the feeding or discharging tray may be provided with the switch mechanism described in the foregoing, if it has to be closed when the apparatus is carried around.

As another embodiment of the present invention, a switch other than the main switch may be provided to shut the power supply in interrelation with the apparatus carrying action. Some of such examples will be explained.

Figure 6A:
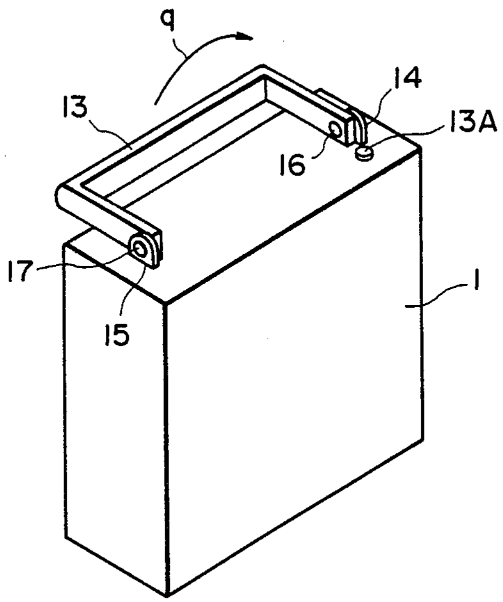
FIGS. 6A, 6B, 7 and 8 are perspective views of the apparatus illustrating a switching action depending on the state of a grip or handle.
Figure 6B:
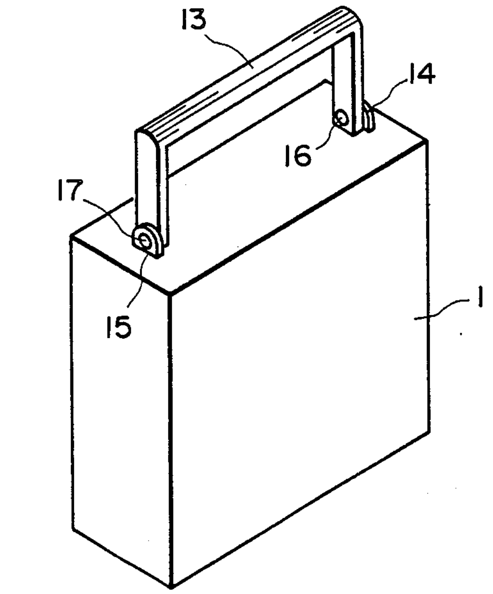

Referring to FIGS. 6A and 6B, the power supply from the battery is shut when a grip or handle is rotated to an upstanding position. In this embodiment, an image forming apparatus includes a main assembly 1, a rotatable grip 13, grip supporting plates 14 and 15 mounted on the main assembly 1 and rotational shafts 16 and 17. FIG. 6A shows a state wherein the grip 13 lies down. When the grip 13 is rotated in the direction indicated by an arrow q to an upstanding position shown in FIG. 6B, an end of the grip 13 depresses a switch 13*a* projected out of a part of a casing of the apparatus 1, by which the power supply from the battery is shut.

Figure 7:
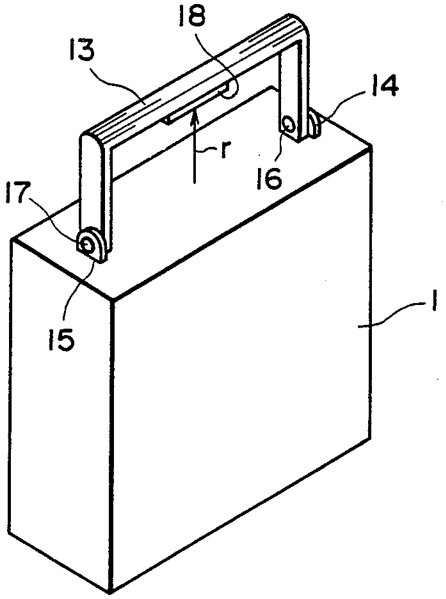

Referring to FIG. 7, there is shown another example wherein the power supply is shut by the operator gripping the handle 13.

The handle or grip 13 is provided with a second switch which is effective to shut power supply from the battery by being depressed in the direction indicated by an arrow r but which is not capable of supplying the power by being actuated, and therefore, which is an unshown first switch for allowing the power supply from the power source. By the gripping action of the handle 13 by the operator, the switch is automatically placed in an OFF state.

Figure 8:
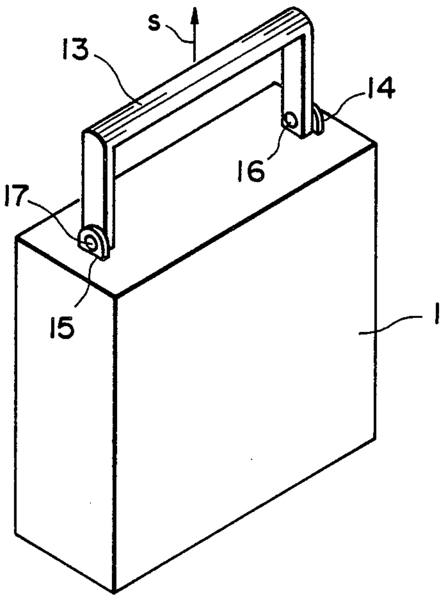

Referring to FIG. 8, there is shown another example, wherein the power supply from the battery is shut by pulling the handle up. In this embodiment, when the grip 13 is lifted in the direction indicated by an arrow s, the grip is displaced upwardly, by which a switch is released from the state being depressed on the contrary to the case of FIG. 6A, by which the power supply from the battery is automatically shut.

In the image forming apparatus provided with a battery for driving the apparatus, the power supply is preferably shut during non-image forming operation as well as when the apparatus is carried about, from the standpoint of safety and prevention of wasteful consumption of the battery. In view of this, the following embodiments are designed to shut the power supply in an inoperative state as well as when the apparatus is carried.

Figure 9:
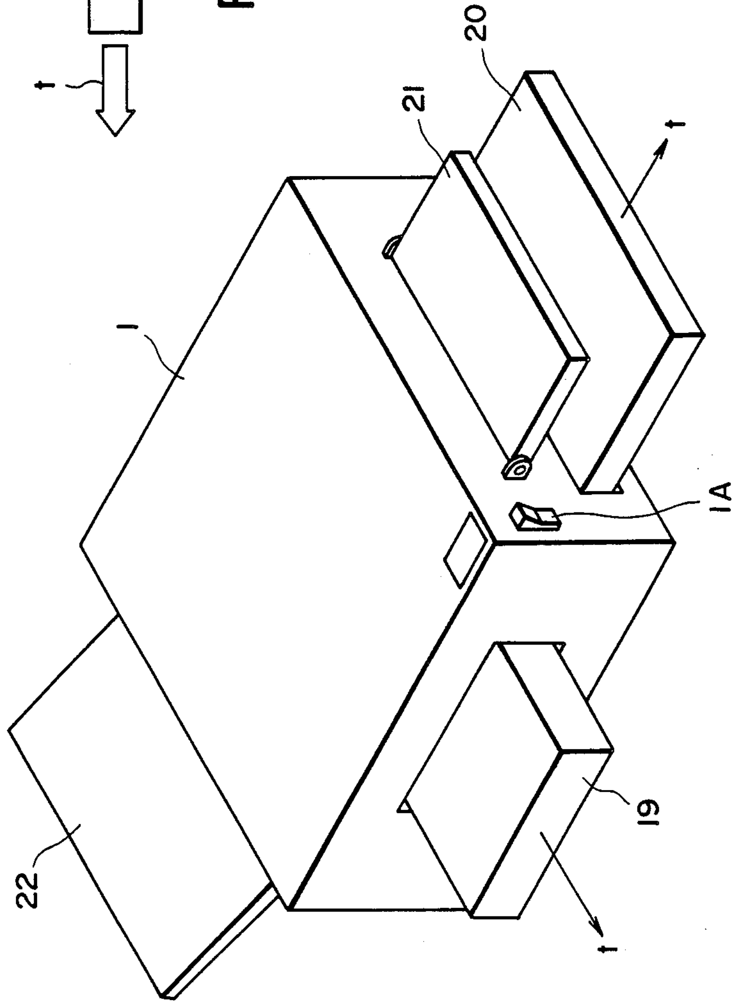
FIG. 9 is a perspective view of the apparatus illustrating a switching operation in accordance with mounting or dismounting of an element.

Referring to FIG. 9, an image forming apparatus includes a main assembly 1, a process cartridge 19 which is detachably mountable into the main assembly and which contains various means for image formation (such a process cartridge is known), a detachably mountable cassette for accommodating transfer materials, a detachably mountable sheet feeding tray 21 and a detachably mountable sheet discharging tray 22 for receiving the transfer sheets on which images have been formed.

Figure 10:
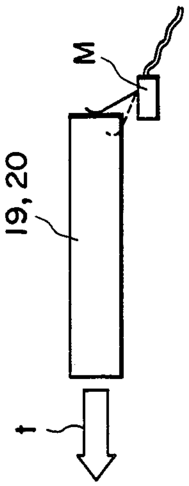
FIG. 10 is a side view illustrating a relation between a switch and a dismountable element.

This apparatus is provided with a second switch M which is different from a first switch 1*a* for allowing supply of the power from the battery. The second switch M is opened to shut the power supply from the battery, by retracting the sheet feeding cassette 20 or the process cartridge 19 from the main assembly 1 in the direction indicated by an arrow t. More particularly, as shown in FIG. 10, the second switch M is a micro-switch, in the main assembly to be actuated by the cartridge 19 or the cassette 20 being retracted in the direction indicated by arrows.

Figure 11:
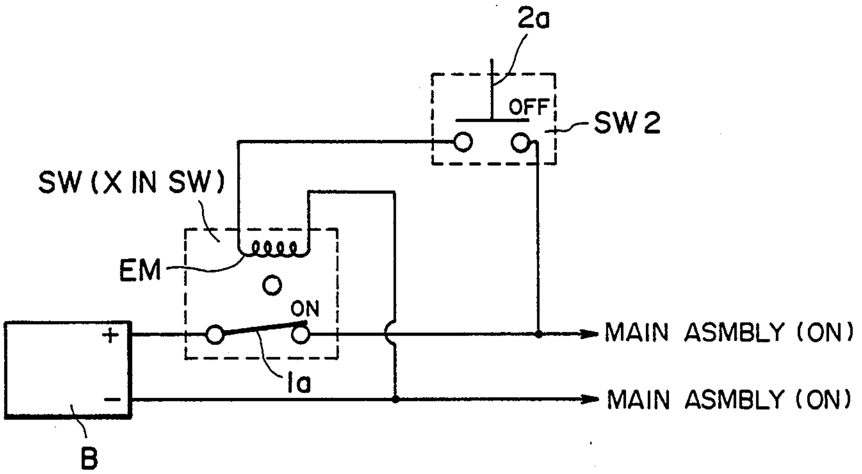
FIGS. 11 and 12 are electric circuits having first and second switches.
Figure 12:
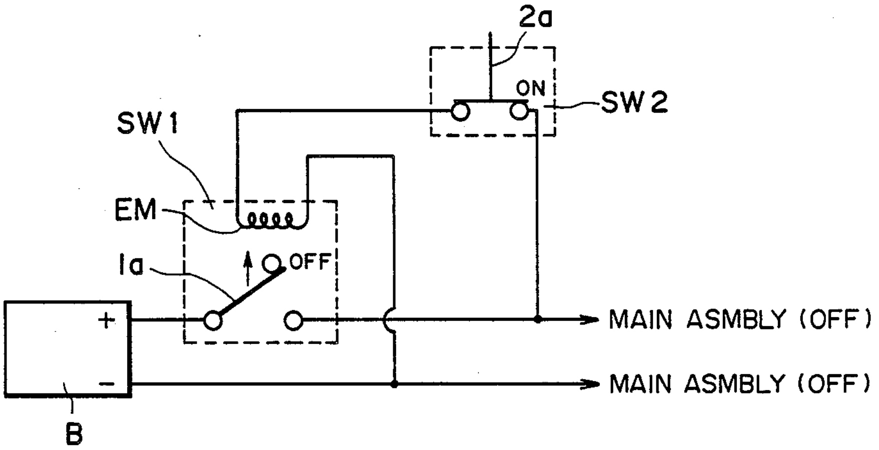

FIGS. 11 and 12 show an electric circuit according to an embodiment of the present invention. The electric circuit includes a power source in the form of a battery B, a first switch SW1 for allowing the power supply from the battery B and a second switch SW2 which is different from the first switch. In this circuit, when the second switch SW2 is rendered OFF under the condition that the first switch is ON, the power supply from the battery is shut, provided that the power is ON. Of course, it is possible to shut the power supply by operating the switch SW1 only.

FIG. 11 shows a state wherein the first switch SW1 is closed, and in which the second switch SW2 is not operated. In this state, since the switch SW1 is ON, the power supply from the battery B is allowed.

FIG. 12 shows a state wherein an actuator 2*a* for the second switch SW2 is operated. When the switch SW2 is rendered ON, an electromagnet EM in the first switch SW1 is energized, upon which the actuator 1*a* is moved to the OFF-contact to shut the electric current from the battery B to the main assembly. After this state is reached, the switch SW1 can not be rendered ON even if the second switch SW2 is actuated. In order to allow the power supply from the battery, the switch SW1 must be rendered ON, again.

The circuit comprising the first and second switches is applicable to the apparatus shown in FIG. 1, in which case the switch 4 is the above described second switch, and a switch for allowing the power supply is provided in the main assembly, in addition to the switch 4.

In the foregoing description of various embodiments, the detailed explanation of the image forming means in the main assembly, has been omitted, since it may be of any well known type, such as an electrophotographic process. When the electrophotographic process is used, the image forming apparatus includes an electrophotographic photosensitive member, means for forming a latent image thereon, means for developing the latent image into a toner image, means for transferring the toner image onto a transfer material and means for fixing the toner image on the transfer material. As for the process cartridge, it may be of a known type such as disclosed in U.S. Pat. No. 4,609,276 (Japanese Patent Application Publication No. 48152/1986), U.S. Pat. Nos. 4,551,000, 4,575,221 or the like. The process cartridge may contain a photosensitive member and some of image forming means as a unit, and is detachably mountable into the main assembly.

As described in the foregoing, according to the embodiments of the present invention, the power supply is shut in association with an action peculiar to the apparatus carrying action or non-image-formation in an image forming apparatus equipped with a battery, whereby the danger of the apparatus starting to operate during the carrying action, wasteful consumption of the battery and failure of the apparatus due to overheating, can be prevented.

Next, the structure for accommodating the battery will be described.

Figure 13:
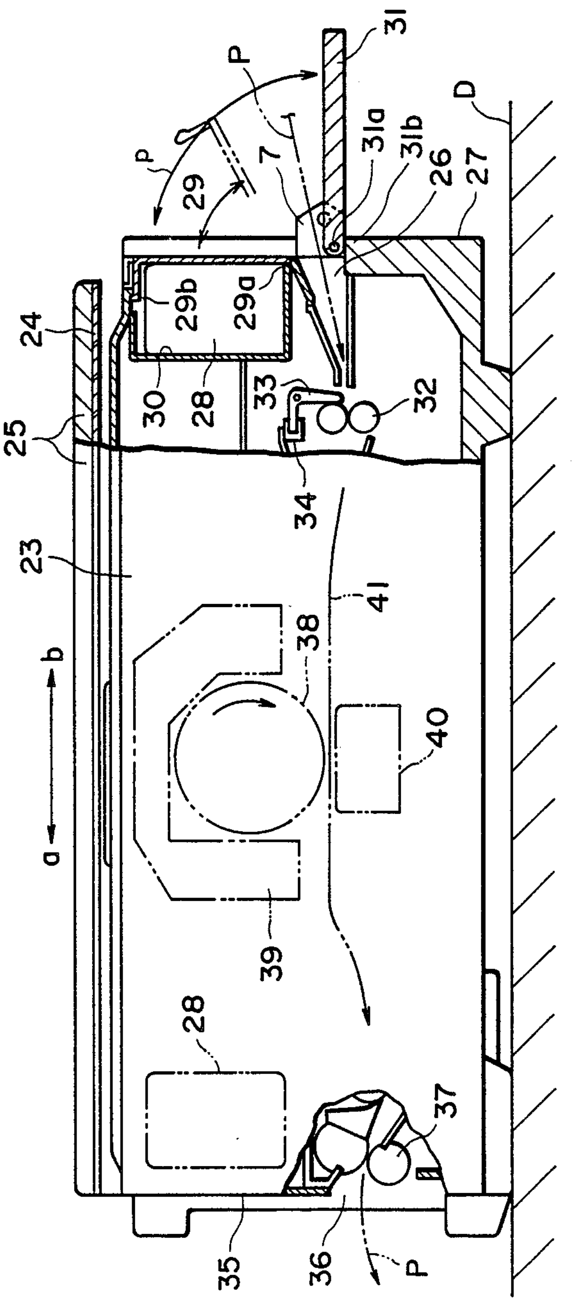
FIG. 13 is a partly broken-away front view of an image forming apparatus according to an embodiment of the present invention, wherein the image forming apparatus is placed laid-down (operative position) and wherein a second cover is opened to function as a feeding tray.
Figure 14:
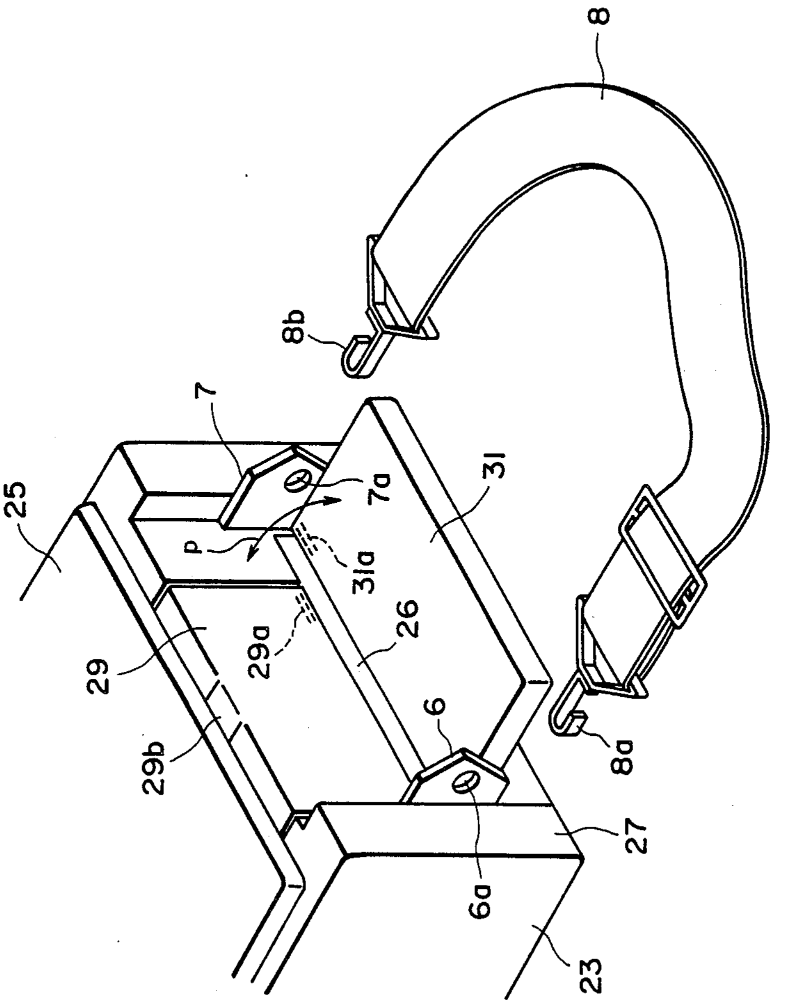
FIG. 14 is a perspective view of the opened second cover.
Figure 15:
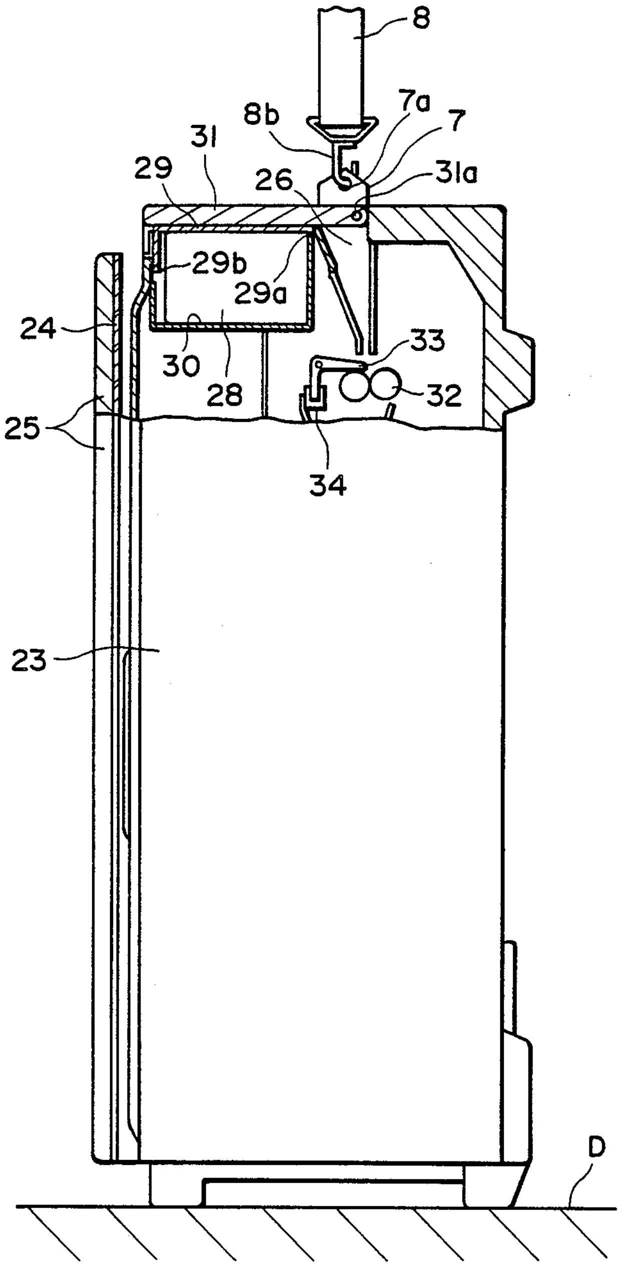
FIG. 15 is a partly broken-away front view of the image forming apparatus, wherein the second cover is closed to backup a first battery cover.

Referring to FIG. 13, there is shown a battery-driven type and portable type electrophotographic copying machine as an exemplary image forming apparatus according to an embodiment of the present invention. The image forming apparatus assumes a horizontal position, that is, it is laid down on a horizontal surface such as a desk surface D or the like, while the second cover is opened. FIG. 14 is a perspective view of the second cover. The apparatus is operated in this position with the second cover being opened. In FIG. 15, the apparatus is placed in an upstanding position, wherein the second cover is closed.

The apparatus shown in FIG. 13 comprises an outer casing 23, an original carriage 24 disposed above the top of the outer casing 23 and reciprocable in the directions indicated by an arrows a and b and an original pressing plate 25 openable and closable with respect to the top surface of the original carriage. An original to be copied is placed face down on the original carriage 24, and the top of the original is pressed by the pressing plate 25.

The apparatus is further provided with a sheet feeding inlet 26 formed in a side wall at the right end and a battery accommodating box 30 having an access opening formed in the same wall above the sheet feeding inlet 26, a battery 28 accommodated in the accommodating box 30 which is effective to supply power to the apparatus for driving various parts thereof and a first battery cover for openably closing the access opening of the battery accommodating box 30. The first battery cover 29 is rotatable about a hinge 29*a*, and is normally closed as shown by solid lines. The cover 29 is clicked by a self-locking pawl 29*b*. It may be a detachably mountable cover.

In any event, the first battery cover 29 and the locking means are of self-locking type utilizing a flexible and resilient plastic material, which is low in cost.

In this embodiment, a second cover 31 is provided which is rotatable about a hinge 31*a* to be overlaid to the outer surface of the first battery cover 29 when it is closed, as shown in FIG. 15. The second cover 31 is openable as shown in FIGS. 13 and 14, wherein the rotation of the cover 31 is stopped by a stopper 31*b* to provide a shelf plate extending outwardly from the apparatus below the sheet feeding inlet 26, by which the second cover 31 functions as a sheet feeding tray.

When the apparatus is to be operated, the apparatus is placed in the horizontal position on a horizontal plane D as shown in FIGS. 13 and 14, and the second cover 31 is opened. Then, a recording medium P in the form of a sheet (transfer material, electrofax paper or electrostatic recording sheet) is inserted into the apparatus through the sheet feeding inlet 26 utilizing the second cover 31 as a sheet feeding tray. When the recording medium P is sufficiently inserted into the apparatus for the leading edge of the sheet to be received by a nip formed between feeding rollers 32 and 32, it is detected by a detecting means constituted by a swingable lever 33 and a photosensor 34. A detection signal produced thereby functions as an image formation starting signal to start the feeding rollers 32 to rotate, whereby the recording medium P is automatically retracted into the apparatus. Movement of the original carriage 24 and operations of the other means are started to form an image on a surface of the recording medium P. The recording medium P on which an image has been formed is discharged by discharging rollers 37 through a discharge outlet 36 formed in a left wall 35 of the casing.

When the apparatus is not operated, it may be placed in an upstanding position shown in FIG. 15, wherein the right wall 27 where the sheet inlet 26 and the battery accommodating box 30 are at an upper position. In this state, the second cover 31 is closed, that is, it is overlaid to an outer surface of the first battery cover 29 which closes the access opening of the battery accommodating box 30. In this upstanding position, an unshown locking mechanism is effective to prevent downward movement of the original carriage 24. Also, the original pressing plate 25 is prevented from opening.

Therefore, when the apparatus is to be carried, the access opening of the battery accommodating box 30 is covered by both of the first battery cover 29 and the second cover 31 overlaid thereto and functioning as a protection cover for the first cover, and therefore, the battery 28 is positively prevented from popping out even by an external shock during the carrying action.

The second cover 31 may be provided with a simple locking means such as a self locking pawl to lock the second cover 31.

When the battery 28 is to be replaced with a fresh one or is to be charged, the second cover 31 is opened while the apparatus is in the horizontal or upstanding position. Then, the first battery cover 29 is opened, and the battery 28 is taken out, whereafter a fresh battery is inserted.

The battery accommodating box 30 may be disposed at the left wall 35 side where the sheet discharging outlet 36 is provided, in which the second cover 31 is used as a sheet discharge tray for the discharging outlet 36. In this case, the apparatus is carried around or placed in non-use state so that the left wall 35 side is at an upper position.

In FIG. 13, the apparatus includes an electrophotographic photosensitive drum 38, around which various process means 39 are provided to form a latent image, to develop the latent image into a toner image and to remove residual toner from the photosensitive drum 38, which are driven by the battery 28. The toner image on the photosensitive drum 31 is transferred onto a transfer material or a recording medium P by image transfer means 40. The transfer material P having received the toner image is conveyed to image fixing rollers 37 where the toner image is fixed thereon into a permanent image. Reference numeral 41 depicts a passage for the transfer material P.

As described in the foregoing, according to the present invention, the battery is positively prevented from popping out of the apparatus due to an external shock during the apparatus carrying action in an image forming apparatus equipped with the battery for driving the apparatus. Further, a second cover functioning for the prevention is also effective to function as a sheet feeding tray or a sheet discharging tray, so that the structure of the apparatus is simplified.

While the invention has been described with reference to the structures disclosed herein, it is not confined to the details set forth and this application is intended to cover such modifications or changes as may come within the purposes of the improvements or the scope of the following claims.

What is claimed is:

1. A portable image forming apparatus, comprising:
- a photosensitive member;
- means for forming an image on a recording medium using said photosensitive member;
- a battery for supplying power to drive said image forming means;
- a guiding member for guiding the recording member, said guiding member being swingably mounted to a frame of said apparatus adjacent an end thereof and being movable between a guiding position wherein the opposite end of the guiding member is away from the frame and an accommodating position wherein the opposite end is close to the frame; and
- a battery accommodating portion for accommodating said battery, said accommodating portion being provided with an openable cover, wherein said guiding member is overlaid to the cover when it takes the accommodating position.

2. An apparatus according to claim 1, further comprising a grip for carrying around said apparatus adjacent said guiding member.

3. An apparatus according to claim 1, wherein the cover of the accommodating portion is openable toward the grip.

4. A portable image forming apparatus, comprising:
- a guiding member for guiding a recording medium on which an image is formed by said image forming apparatus, said guiding member being swingable supported on a frame of said apparatus adjacent an end thereof and being movable between a guiding position wherein the opposite end of the guiding member is away from the frame and an accommodating position wherein the opposite end thereof is close to the frame;
- switching means for supplying power; and;
- an actuator, provided on said guiding member, for turning off said switching means when it takes the accommodating position; and
- wherein when said guiding member is placed in the guiding position after being in the accommodating position, said switching means is kept unactuated.

5. An apparatus according to claim 4, further comprising a second switching means operated by said first mentioned switching means.

6. An apparatus according to claim 5, wherein said second switching means is capable of turning on independently from said first switching means, when said first switching means is turned off.

7. An apparatus according to claim 4, further comprising a grip for carrying around said apparatus adjacent said guiding member.

8. An apparatus according to claim 4, wherein a gripping portion is formed below a position where the guiding member is swingably mounted.

9. An apparatus according to claim 4, further comprising a battery for driving image forming means for the image formation by said image forming apparatus, the power being supplied from the battery.

10. A portable image forming apparatus, comprising:
- a guiding member for guiding a recording medium on which an image is formed by said image forming apparatus, said member being swingably supported on a frame of said apparatus adjacent an end thereof and being movable between a guiding position wherein the opposite end of the guiding member is away from the frame and an accommodating position wherein the opposite end thereof is close to the frame;
- switching means for supplying power;
- an actuator, provided on said guiding member, for turning off said switching means when it takes the accommodating position; and
- a grip mount for mounting a grip to the apparatus when the apparatus is carried, wherein the grip is mountable only when said guiding member is at the accommodating position.

11. An apparatus according to claim 10, said apparatus further comprising a battery for driving image forming means for the image formation by said image forming apparatus, the power being supplied from the battery.

12. An apparatus according to claim 10, wherein said switching means is kept off when said guiding member takes the guiding position after said guiding member takes the accommodating position.

13. An apparatus according to claim 10, wherein said grip mount is adjacent said guiding member.

14. A portable image forming apparatus, comprising:

a photosensitive member;

means for forming an image on a recording medium using said photosensitive member;

a battery for supplying power to drive said image forming means;

a guiding member for guiding the recording member, said guiding member being swingably mounted to a frame of said apparatus adjacent an end thereof and being movable between a guiding position wherein the opposite end of the guiding member is away from the frame and an accommodating position wherein the opposite end is close to the frame; and an accommodating portion for accommodating said battery, said accommodating portion has an access opening for the battery which is closed by said guiding member when it takes the accommodating position.

* * * * *

UNITED STATES PATENT AND TRADEMARK OFFICE
CERTIFICATE OF CORRECTION

PATENT NO. : 4,896,190

DATED : January 23, 1990

INVENTOR(S) : Haruo Uchida, et al.

It is certified that error appears in the above-identified patent and that said Letters Patent is hereby corrected as shown below:

Column 8:

Line 16, "claim 1, " should read --claim 2,--.

Line 22, "swingable" should read --swingably--.

Line 29, "and;" should be deleted.

Signed and Sealed this

Ninth Day of April, 1991

*Attest:*

HARRY F. MANBECK, JR.

*Attesting Officer* — *Commissioner of Patents and Trademarks*

UNITED STATES PATENT AND TRADEMARK OFFICE

CERTIFICATE OF CORRECTION

PATENT NO. : 4,896,190

DATED : January 23, 1990

INVENTOR(S) : Haruo Uchida et al

It is certified that error appears in the above-identified patent and that said Letters Patent is hereby corrected as shown below:

COLUMN 3:

Line 43, "inoperative" should read --in operative--.

COLUMN 6:

Line 14, "an" (first occurrence) should be deleted.

Signed and Sealed this

Twenty-second Day of September, 1992

*Attest:*

DOUGLAS B. COMER

*Attesting Officer* *Acting Commissioner of Patents and Trademarks*